May 24, 1955
K. J. NEARY
2,708,825
JET NOZZLE ACTUATING MECHANISM
Filed Feb. 23, 1952
3 Sheets-Sheet 1
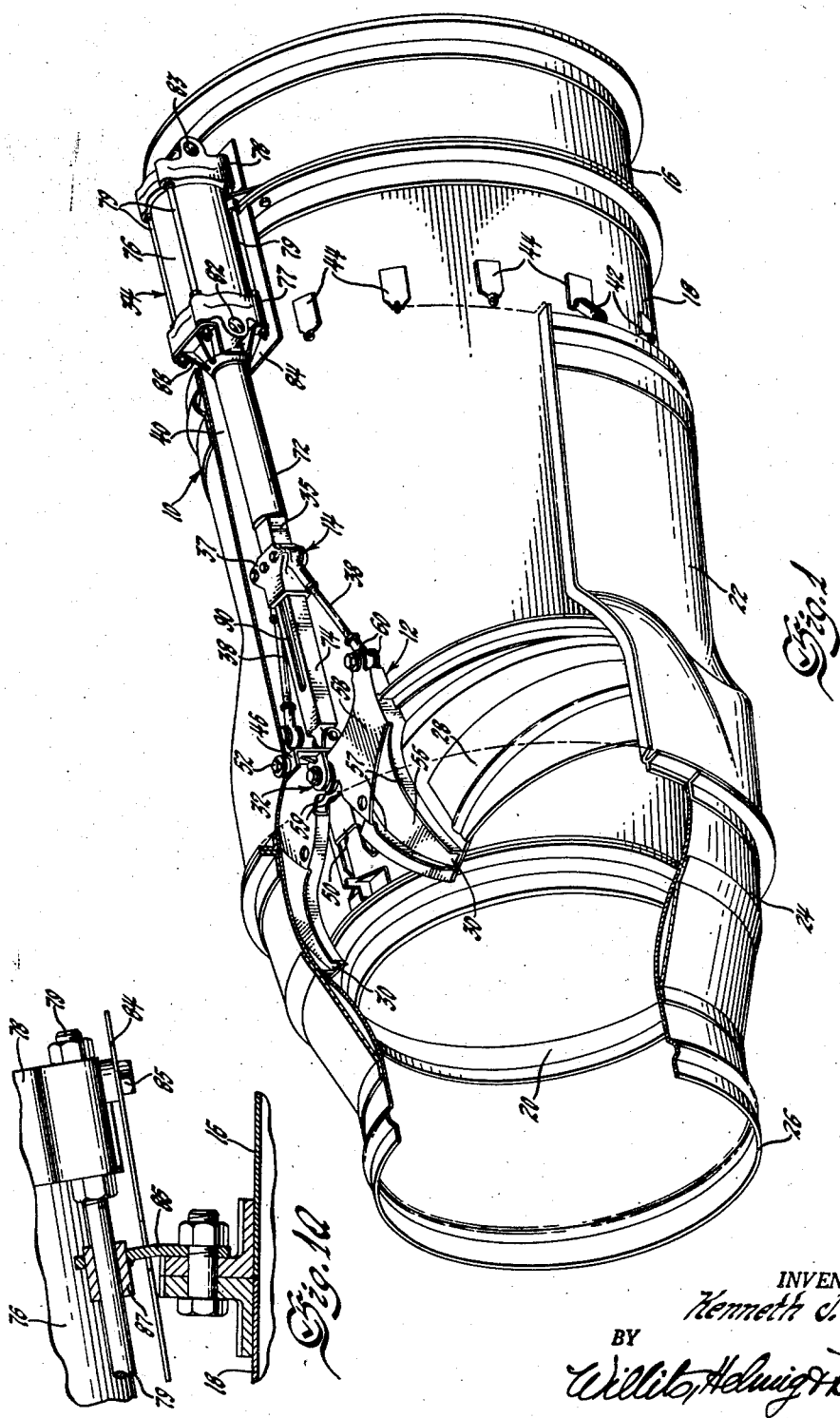
INVENTOR.
Kenneth J. Neary
BY
Willite, Helwig & Baillio
ATTORNEYS May 24, 1955 K. J. NEARY 2,708,825
JET NOZZLE ACTUATING MECHANISM
Filed Feb. 23, 1952 3 Sheets-Sheet 2
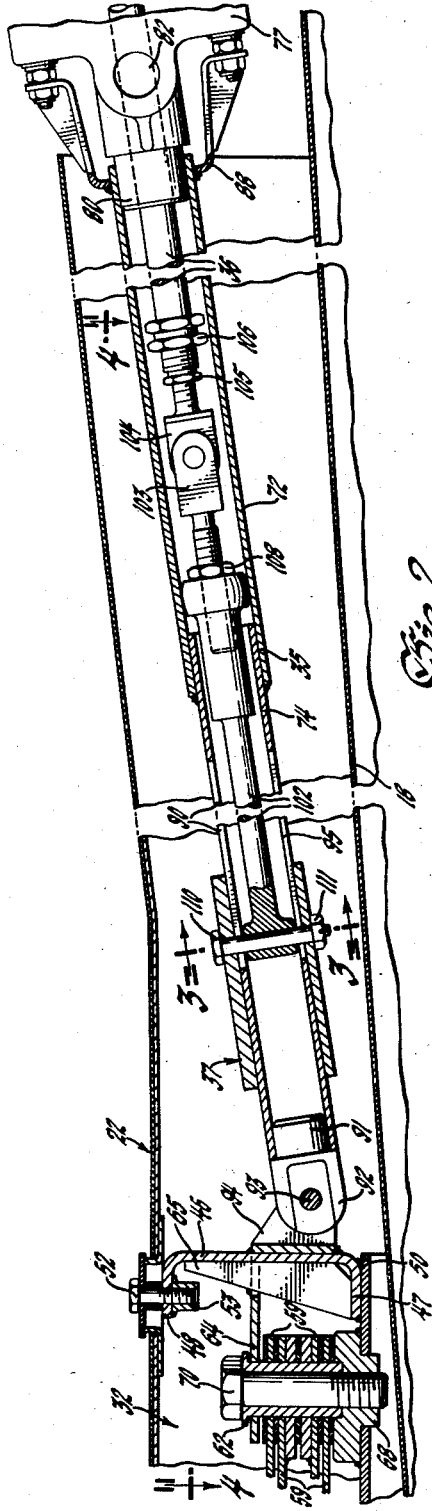
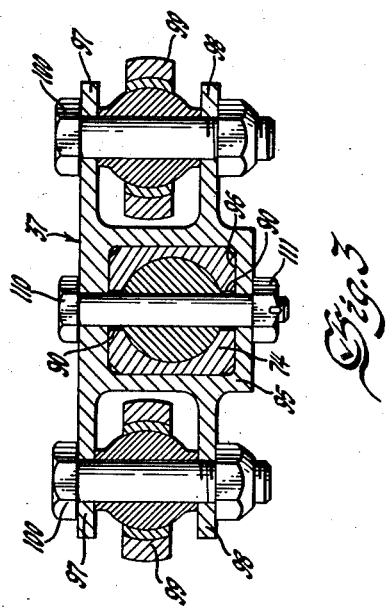
INVENTOR.
Kenneth J. Neary
BY
Willits, Helwig & Baillie
ATTORNEYS May 24, 1955
K. J. NEARY
2,708,825
JET NOZZLE ACTUATING MECHANISM
Filed Feb. 23, 1952
3 Sheets-Sheet 3
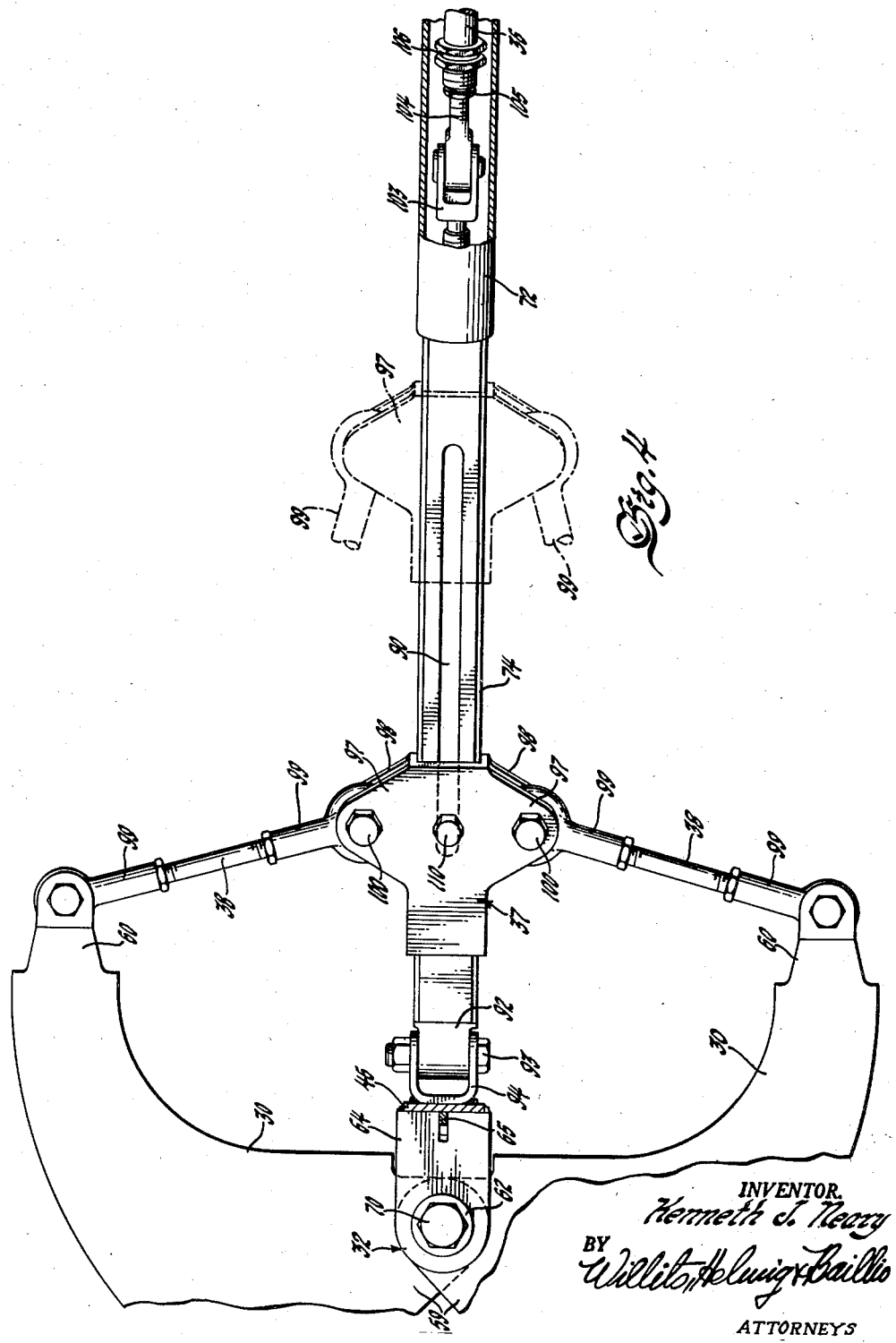
INVENTOR.
Kenneth J. Neary
BY
ATTORNEYS United States Patent Office 2,708,825
Patented May 24, 1955

2,708,825

JET NOZZLE ACTUATING MECHANISM

Kenneth J. Neary, San Diego, Calif., assignor to General Motors Corporation, Detroit, Mich., a corporation of Delaware Application February 23, 1952, Serial No. 273,073

9 Claims. (Cl. 60—35.6)

This invention relates to variable area propulsion nozzles for use with jet propulsion engines and more particularly to operating mechanisms for actuation of variable area jet nozzles.

It has been generally recognized that the operating characteristics of jet propulsion engines, such as gas turbine jet engines, may be improved by the provision of means for varying the area of a jet nozzle, and many structural arrangements for this purpose have been proposed.

The present invention is directed to an improved operating mechanism for the actuation of variable propulsion jet nozzles of the adjustable valve or visor type commonly employed on afterburner turbojet installations wherein retractible flaps or visors are moved to restrict or enlarge the area of the gas jet orifice.

The invention has for its principal objective the provision of an improved operating mechanism for actuation of the valves or visors, also called the eyelids, of a variable area jet nozzle device wherein the thrust and reaction forces of the actuating member are confined within the parts of the operating mechanism instead of being distributed through the skin or shell of the tail pipe of the engine or of the afterburner.

Another object is to provide a variable area nozzle actuating mechanism the construction of which is such as will resist twisting forces that may be exerted thereon due to unbalanced resistance to movement of the eyelids or other causes, whereby binding of the moving parts of the operating mechanism will be obviated.

Still other objects are to provide a simple, efficient, and inexpensive jet nozzle eyelid operating mechanism that is rugged, light in weight, and reliable in operation.

The above and other objects, together with the features and advantages attending the invention, will appear more fully from the following description and drawings, wherein:

Fig. 1 is an axonometric view of a preferred form of operating mechanism in accordance with the invention for actuation of a variable area jet nozzle employed on an afterburner installation for a turbojet propulsion engine; Fig. 1A is a detail of a part of Fig. 1; Fig. 2 is a partial sectional elevation view of the actuating mechanism employed in Fig. 1; Fig. 3 is a transverse sectional view taken in the plane 3—3 of Fig. 2; and Fig. 4 is a plan view of the operating mechanism of Figs. 1 and 2, with parts in section taken in the plane 4—4 of Fig. 2.

Referring to the drawings, Fig. 1 illustrates an afterburner 10 for a turbojet engine including a variable area jet nozzle 12 and operating mechanism 14 in accordance with a preferred embodiment of the invention for actuating the jet nozzle. The remainder of the engine is not illustrated because the structure of such engine is well known and the details of the engine are immaterial to the invention. The assembly of Fig. 1 is fixed to the turbine exhaust pipe of a turbojet engine in known manner.

The afterburner 10, apart from the actuator of this invention, is of a known type, and comprises, in general, a fuel manifold section 16 followed by the afterburner combustion chamber 18 which terminates in a fixed converging outlet nozzle portion 20. Surrounding the afterburner is a forward shroud or heat shield 22 and an annular after shroud 24, the latter terminating in a jet propulsion nozzle 26. The after shroud 24 is fitted to the forward shroud 22 and surrounds the outlet nozzle 20, extending slightly therebeyond as shown.

The jet nozzle 12 is of the known adjustable valve or visor type and comprises, in general, a pair of opposed visors or eyelid members 28 of generally spherical contour, each including a plate 30 secured to each of the ends thereof rotatably mounted on pivot arrangements, one of which is indicated at 32. The pivots, which extend from the wall of the tail pipe or afterburner, are aligned with a diameter thereof and define an axis of rotation normal to the axis of the engine. The eyelids are shown in their open position in which the opening between them is a maximum, and may be swung inwardly about the pivots over the fixed nozzle 20 to restrict the jet nozzle orifice.

The operating mechanism 14 by which the eyelids 28 of the variable nozzle are opened and closed comprises a pair of motors 34 (only one of which is shown), preferably of the air cylinder type, mounted on opposite sides of the engine. Extending longitudinally on each side of the tail pipe and connected between each of the pivot arrangements 32 and the motors is a hollow guide member 35 that encloses and guides the thrust member which includes a piston rod 36 (Figs. 2 and 4) of the cyinder. The guide member is coupled between a pivot 32 and motor 34 for transmission of tension and compression forces therebetween. The lower portion of the guide member is of non-circular cross section (preferably square) and has slidably mounted thereon a crosshead 37 that is coupled to the piston rod of the cylinder. A pair of links 38 are pivotally connected between the crosshead and the eyelid parts 30 for actuation thereof, as will be explained more fully.

Fuel supplied at the manifold section 16 burns in the afterburner pipe 18 to increase the velocity of the propulsive jet. The shroud 22 enclosing the afterburner 18 provides for circulation of air around the afterburner for cooling, the air being admitted through an annular opening 40 between the shroud 22 and tail pipe 18.

Gas temperatures in the afterburner may commonly reach 2400° F. The pressure and velocity of the escaping jet also are high. As a result, the surface or shell of the afterburner pipe 18 operates at high temperatures and is likely to buckle or warp if subjected to mechanical stresses occasioned, for example, by the thrust and reaction forces of the variable area nozzle operating mechanism. Furthermore, the pressure of the escaping jet on the eyelid members 28 may tend to establish a twisting moment that is imparted to the operating mechanism 14 and is likely to cause binding of the moving parts thereof. In accordance with one aspect of the present invention, the thrust and reaction forces are removed from the afterburner shell and are confined within the structure of the operating mechanism, as will be described hereinafter. In accordance with another aspect of the invention, twisting of the operating mechanism is also prevented.

Referring to Fig. 1, the forward portion of the shroud 22 is maintained in spaced relation to and supported from the afterburner pipe 18 at a number of points by swinging coupling links 42 which are connected between a plurality of eye brackets 44 welded to the tail pipe 18 and a corresponding number of similar eye brackets on the forward end of the shroud 22 to allow for both longitudinal and radial differential expansion of the forward shroud 22.

The after end of the shroud 22 is supported from the tail pipe 18 at two points by a pair of support posts on opposite sides of the engine. As best shown in Fig. 2, each support comprises a reinforced channel-shaped bracket 46, one leg 47 of which is welded to a raised channel platform member 50 (Figs. 1 and 2) which in turn is welded to the afterburner pipe 18, the platform member 50 serving to provide a plane mounting surface for the eyelid pivots 32 parallel to the axis of the engine. A bolt 52 passing through the shroud 22 and the other leg 48 of the bracket 46 engages a nut 53 welded to the inner surface of the bracket leg 46.

The variable area jet nozzle 12 shown in Fig. 1 comprises a pair of eyelids 28 which are fitted with curved brackets 30 welded or otherwise secured thereto. The members 30 comprise a substantially spherical triangular plate 56 with flanges 57 and a plate 58 extending from the base or forward portion approximately to the midportion thereof so as to form a box section, one corner of which is provided with a pair of ears 59 (Figs. 1, 2 and 4) one above the other and pivotally mounted on the pivot arrangement 32, and the other corner with a pair of ears 60 forming a clevis for connecting a link 38 of the actuating mechanism 14.

The pivot arrangement for the eyelids is best shown in Fig. 2. Each of the two pivot arrangements comprises a shouldered sleeve spindle or hinge pin member 62 on which the ears 59 of the eyelids 30 are pivotally mounted. The shouldered end of the spindle 62 is braced by a plate 64 that is welded to the web of the shroud support post 46, the latter having a gusset plate 65 welded thereto as shown. The support post 46 is thus connected to the pivot 32 and aids in relieving the reaction forces from the afterburner shell as will appear hereinafter. The body of the spindle 62 passes through a circular opening in the plate 64 and both of the hinged ears 59 of each of the eyelids 30. The inner end of the spindle is retained in a recess in an internally threaded plate 68 that is welded to the raised channel platform 50. The spindle is inserted with the eyelids assembled in place in interleaved position as shown and is retained by a bolt 70 passing through the spindle and received in the threaded plate.

Turning now to the eyelid operating mechanisms 14, each operating mechanism is a non-extensible in-line assembly comprising an actuating motor 34 such as an air cylinder and the hollow guide member 35 which comprises a tubular housing 72 fitted to the cylinder 34 and a hollow torque rod 74, one end of which is fixed to the end of the tubular housing and the other end bracketed to the support post 46. Slidably mounted on the torque rod is the crosshead 37.

The actuating motor comprises a cylindrical casing 76 having heads 77 and 78 at both ends thereof and secured together by tie rods 79 extending longitudinally of the casing through the cylinder heads as shown in Fig. 1. The casing 76 encloses a piston (not shown) the rod 36 of which extends through a cylindrical boss 80 (Fig. 2) in the cylinder head 77. Ports 82 and 83 are provided in the cylinder heads for purpose of supplying air thereto to effect displacement of the piston. The mounting of each of the operating motors 34 comprises a heat shield 84 the corners of which are fastened to the cylinder heads 77, 78 by cap screws 85 or the like. As best shown in Fig. 1A, the heat shield and air cylinder are spaced and supported from the hot shell of the afterburner by bracket supports 86 on opposite sides of the cylinder. One end of each of the brackets 86 contains a sleeve 87 welded in a circular opening therein, the other end of the bracket being bolted to the coupling flange of the afterburner pipe 18. The tie rods 79 adjacent the heat shield pass through the sleeves in respective ones of the brackets 86 and the heat shield is slotted so as to provide a slidable mounting of the heat shield and cylinder to allow for longitudinal expansion of the afterburner and to prevent cylinder thrust from loading the afterburner skin.

The tubular housing 72 of the guide member 35 may be of circular or other cross section and is piloted on the cylindrical boss 80 on the cylinder head 77 to provide a rigid assembly of the cylinder and guide member in line with the eyelid pivot with which it is associated. A webbed bracket 88 welded to the tubular housing and fastened to the cylinder head 77 by nuts on the tie rods 79 secure the guide member to the cylinder as shown in Figs. 1 and 2.

The torque rod 74 is of noncircular cross section so as to prevent rotation of the crosshead 37 thereabout. Preferably, the torque rod is of square cross section with broken edges as shown in Fig. 3, and has a cylindrical bore extending therethrough. Elongated slots 90 (Fig. 4) extending substantially the length of the hollow torque rod are formed in the outer and inner surfaces thereof to provide for coupling the crosshead 37 to the piston rod 36 of the cylinder. The forward end of the torque rod is cylindrical and is piloted in and welded to the end of the tubular housing 72. A plug 91 having a tongue or eye 92 integrally formed at the other end thereof is fitted into the rear end of the torque rod 74 and is fastened by a bolt and nut 93 to a clevis bracket 94 welded or otherwise attached to the support post 46.

As best shown in Fig. 3, the crosshead 37 comprises a substantially square body portion 95 with a corresponding square opening 96 therein and two pairs of integrally formed spaced arms 97, 98 extending from opposite sides thereof so as to form a pair of clevises for the links 38. By reason of the shape of the crosshead and torque rod, the crosshead is restrained against rotation thereabout. The links 38 are provided with conventional ball and socket eye fittings 99 at each end thereof, the links 38 and the eye fittings 99 being threaded to allow for adjustment of their overall length. The fittings 99 are coupled to the arms 97, 98 of the crosshead 37 by bolts 100 passing through the crosshead clevises 97, 98 and the eye fittings 99, as shown in Fig. 3. The fittings 99 are coupled to the eyelid clamshell ears 60 in like manner.

The tubular housing 72 and torque rod 74 serve as guides for the enclosed cylinder piston rod 36 and for a piloted connecting rod 102 that is coupled to the piston rod through a joint such as a clevis 103 and tongue 104 (Figs. 2 and 4) that adjusts for any misalignment and prevents binding between the moving parts of the actuator assembly. The end of the tongue 104 is threaded into an internally threaded end of the piston rod 36 and is locked thereto by means of a jam nut 105. A stop member 106 in the form of a hexagonal nut fitting threaded onto the end of the piston rod 36 is provided to limit the backward stroke of the latter. The threaded end of the clevis 103 is threaded into the forward end of the connecting rod 102 and locked thereto by means of a jam nut 108. Both ends of the connecting rod 102 are formed with rounded heads which are guided within the cylindrical bore of the torque rod and the interior of the tubular housing which are accurately machined to insure alignment of the moving parts and to prevent side thrust on the piston rod. The connecting rod 102 is connected to the crosshead 37 by means of a transverse pin 110 and nut 111, the pin extending through the elongated slots 90 formed in the hollow torque rod.

It is believed that the operation of the eyelid operating mechanism will be clear to those skilled in the art from the foregoing, but it may be described briefly. The cylinder 34 is coupled to a suitable source of air or other fluid under pressure which is supplied to either of the ports 82, 83 (Fig. 1) of the cylinder through a suitable valve (not shown). When air is supplied to the port 83, the crosshead 37 is moved rearwardly (as shown by the full lines on Fig. 4) pushing on the links 38 to close the eyelids. To open the eyelids, air is supplied to the port 82, causing the crosshead 37 to move in a forward direction as shown by the dotted lines of Fig. 4.

The thrust of the cylinder is exerted through a circuit which includes the piston rod 36 in series with the connecting rod 102 and crosshead 37, from the crosshead through the links 38, the ears 60 of the eyelids 30 and then to the pivot 32. The circuit of the reaction forces extends from the pivot 32 and shroud support post 46, the torque rod 74 and tubular housing 72, and then to the cylinder head 77 of the air cylinder actuator 34. It is thus seen that the working and reaction forces are evenly distributed about the eyelid pivots and are confined within the structure of the operating mechanism. Since these forces are not distributed through the shell of the afterburner, buckling or warping thereof is not likely to occur. Moreover, deflection of the torque rod and tubular housing of the operating mechanism due to unbalanced resistance to movement by the eyelids or to other causes also is prevented by reason of the shape of the torque rod and crosshead.

It is to be understood that the above described arrangement is but illustrative of the application of the principles of the invention and that numerous other arrangements may be devised by those skilled in the art without departing from the spirit and scope of the invention.

I claim:

1. In combination, a reciprocable drive motor having a movable part and a stationary part, pivot means spaced from said motor, means movable by said motor rotatably mounted on said pivot means, a thrust member coupled to the movable part of said motor, reaction means extending between said pivot means and the stationary part of said motor, said reaction means having a surface in contact with said thrust member providing a guide restraining said thrust member against relative rotary movement, said movable means being coupled to said thrust member.

2. In combination, a motor having a casing and a part reciprocable thereof, pivot means spaced from said motor, means movable by said motor and rotatable on said pivot means, a frame extending between said motor and said pivot means, a thrust member coupled to said reciprocable part of said motor, a tubular reaction member coaxial with said thrust member and extending between said pivot means and said casing of said motor for transmission of tension and compression forces therebetween, and a crosshead coupled to said thrust member and to said movable means and slidable on said reaction member, said tubular reaction member having a surface in contact with said crosshead providing a guide therefor and being of substantially rectangular cross-section for restraining said crosshead against relative rotary movement thereon.

3. In apparatus including a jet pipe having at least two adjustable visor members constituting a variable area nozzle rotatably mounted on pivot means defining an axis of rotation normal to the axis of the pipe and means for actuating the visor members including reciprocable actuator means having a first part mounted on the pipe forwardly of the pivot means and a second part movable longitudinally thereof; the combination with said actuator means wherein said actuating means comprises a thrust member coupled to the movable part of said actuator means, a reaction member extending longitudinally of said pipe between the said first part of said actuator means and said pivot means for transmission of reaction forces therebetween and means slidable on said reaction member and coupled to said thrust member and said visor members, said reaction member having a surface in contact with said thrust member providing a guide therefor.

4. In apparatus including a jet pipe having at least two adjustable visor members constituting a variable area nozzle rotatably mounted on pivot means defining an axis of rotation normal to the axis of the pipe and means for actuating the visor members including reciprocable actuator means having a first part mounted on the pipe forwardly of the pivot means and a second part movable longitudinally thereof; the combination with said actuator means wherein said actuating means comprises a thrust member coupled to the said movable part of said actuator means, a reaction member parallel to said thrust member and extending longitudinally of said pipe between the said first part of said actuator means and said pivot means for transmission of reaction forces therebetween and a crosshead slidable on said reaction member and coupled to said thrust member and said visor members, said reaction member having a surface in slidable contact with said thrust member providing a guide therefor and having a guideway thereon co-operating with the crosshead for restraining the latter against relative rotary movement thereon.

5. In apparatus including a jet pipe having at least two adjustable visor members constituting a variable area nozzle rotatably mounted on pivot means defining an axis of rotation normal to the axis of the pipe and means for actuating the visor members including reciprocable actuator means having a casing mounted on the pipe and a part reciprocable longitudinally thereof; the combination with said actuator means wherein said actuating means comprises a thrust member coupled to the said reciprocable part of said actuator means, a reaction member surrounding said thrust member and extending longitudinally of said pipe between said casing of said actuator means and said pivot means for transmission of reaction forces therebetween and a crosshead slidable on said reaction member and coupled to said thrust member and said visor members, said reaction member having a surface in contact with said thrust member providing a guide therefor and having at least one planular surface defining a guideway thereon cooperating with said crosshead for restraining the latter against relative rotary movement thereon.

6. In apparatus including a jet pipe having at least two adjustable visor members constituting a variable area nozzle rotatably mounted on pivot means defining an axis of rotation normal to the axis of the pipe and means for actuating the visor members including reciprocable actuator means having a casing mounted on the pipe forwardly of the pivot means and a part reciprocable longitudinally thereof; the combination with said actuator means wherein said actuating means comprises a thrust member coupled to the said reciprocable part of said actuator means, a tubular reaction member coaxial with said thrust member and extending longitudinally of said pipe between the said casing of said actuator means and said pivot means for transmission of reaction forces therebetween, said reaction member having a slot extending longitudinally thereof and a surface in contact with said thrust member providing a guide therefor, and a crosshead slidable on said reaction member and coupled to said thrust member through the slotted reaction member and to said visor members.

7. In apparatus including a jet pipe having at least two adjustable visor members constituting a variable area nozzle rotatably mounted on pivot means defining an axis of rotation normal to the axis of the pipe and means for actuating the visor members including reciprocable actuator means having a casing mounted on the pipe forwardly of the pivot means and a part reciprocable longitudinally thereof; the combination with said actuator means wherein said actuating means comprises a thrust member coupled to the said reciprocable part of said actuator means, a tubular reaction member coaxial with said thrust member and extending longitudinally of said pipe between the said casing of said actuator means and said pivot means for transmission of reaction forces therebetween, said reaction member having a slot extending longitudinally thereof, and a crosshead slidable on said reaction member and coupled to said thrust member through the slotted reaction member and to said visor members, the internal surface of said reaction member being in slidable contact with said thrust member providing a guide therefor and the external surface thereof having a guideway extending longitudinally thereof for restraining said crosshead against relative rotary movement thereon.

8. In apparatus including a jet pipe having at least two adjustable visor members constituting a variable area nozzle rotatably mounted on pivot means defining an axis of rotation normal to the axis of the pipes and means for actuating the visor members including reciprocable actuator means having a casing mounted on the pipe forwardly of the pivot means and a part reciprocable longitudinally thereof; the combination with said actuator means wherein said actuating means comprises a thrust member coupled to the said reciprocable part of said actuator means, a tubular reaction member coaxial with said thrust member and extending longitudinally of said pipe between the said casing of said actuator means and said pivot means for transmission of reaction forces therebetween, said tubular reaction member having a slot extending longitudinally thereof and having the internal surface thereof in contact with said thrust member providing a guide therefor and a crosshead slidable on the exterior of said reaction member and coupled to said thrust member through the slotted reaction member and to said visor members, said reaction member and crosshead being of complementary polygonal cross-section for restraining the crosshead against relative rotary movement on the reaction member.

9. In apparatus including a jet pipe having at least two adjustable visor members constituting a variable area nozzle rotatably mounted on pivot means defining an axis of rotation normal to the axis of the pipe and means for actuating the visor members including reciprocable actuator means having a casing mounted on the pipe forwardly of the pivot means and a part reciprocable longitudinally thereof; the combination with said actuator means wherein said actuating means comprises a thrust member coupled to the said reciprocable part of said actuator means, a tubular reaction member extending longitudinally of said pipe between the said casing of said actuator means and said pivot means for transmission of reaction forces therebetween, said reaction member having a slot extending longitudinally thereof and having a surface in contact with said thrust member providing a guide therefor and a crosshead slidable on said reaction member and coupled to said thrust member through the slotted reaction member and to said visor members, said reaction member being of substantially rectangular external cross-section for restraining said crosshead against relative rotary movement thereon.

References Cited in the file of this patent

UNITED STATES PATENTS

| | | |
|---|---|---|
| 1,005,473 | Rennerfelt | Oct. 10, 1911 |
| 2,523,842 | Oulianoff | Sept. 26, 1950 |
| 2,551,372 | Haltenberger | May 1, 1951 |
| 2,601,193 | Wettley | June 17, 1952 |

FOREIGN PATENTS

| | | |
|---|---|---|
| 613,989 | Great Britain | Dec. 8, 1948 |